United States Patent
Nakada

(10) Patent No.: US 9,488,115 B2
(45) Date of Patent: Nov. 8, 2016

(54) CONTROL DEVICE OF INTERNAL COMBUSTION ENGINE

(75) Inventor: Hayato Nakada, Yamanashi-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 351 days.

(21) Appl. No.: 14/239,438

(22) PCT Filed: Oct. 4, 2011

(86) PCT No.: PCT/JP2011/072848
§ 371 (c)(1),
(2), (4) Date: Feb. 18, 2014

(87) PCT Pub. No.: WO2013/051108
PCT Pub. Date: Apr. 11, 2013

(65) Prior Publication Data
US 2014/0209072 A1    Jul. 31, 2014

(51) Int. Cl.
*B60T 7/12* (2006.01)
*F02D 21/08* (2006.01)
(Continued)

(52) U.S. Cl.
CPC .......... *F02D 21/08* (2013.01); *F02D 41/0047* (2013.01); *F02D 41/26* (2013.01); *G06F 1/32* (2013.01); *G06F 9/5094* (2013.01);
(Continued)

(58) Field of Classification Search
CPC ............ F02M 25/071; F02M 25/0702; F02D 41/005; F02D 41/0077
USPC ............... 701/108, 114; 123/568.11, 568.16, 123/568.21, 568.26; 60/286
See application file for complete search history.

(56) References Cited

U.S. PATENT DOCUMENTS

2008/0148826 A1*  6/2008  Raichle ............... F02D 35/028
                                                            73/114.27
2010/0004841 A1     1/2010  Mueller et al.
(Continued)

FOREIGN PATENT DOCUMENTS

| JP | 2007 125950 | 5/2007 |
| JP | 2008 269487 | 11/2008 |
| JP | 2009 541636 | 11/2009 |
| JP | 2011 153596 | 8/2011 |

OTHER PUBLICATIONS

International Search Report Issued Nov. 8, 2011 in PCT/JP11/072848 Filed Oct. 4, 2011.

*Primary Examiner* — John Kwon
(74) *Attorney, Agent, or Firm* — Oblon, McClelland, Maier & Neustadt, L.L.P.

(57) ABSTRACT

A device of an internal combustion engine, which has a multicore processor including a plurality of cores mounted thereon and is capable of calculating various calculations relating to an operation of the internal combustion engine in parallel by the plurality of cores, includes a calculation unit that assigns a task of the calculations to at least one of the plurality of cores and performs the calculation, an EGR unit that controls an EGR operation that recirculates a gas flowing in an exhaust system of the internal combustion engine to an intake system, and a control unit that decreases a number of cores that are used in the calculation unit to be smaller as compared with before stop, when the EGR operation is stopped. The calculation unit includes an assigning unit that assigns a task of a specific calculation relating to the EGR operation to one or a plurality of designated cores, and when the EGR operation is stopped, the control unit stops the designated core or cores.

4 Claims, 2 Drawing Sheets

(51) Int. Cl.
- *F02D 41/26* (2006.01)
- *F02D 41/00* (2006.01)
- *G06F 9/50* (2006.01)
- *G06F 1/32* (2006.01)

(52) U.S. Cl.
CPC .......... *F02D2250/12* (2013.01); *Y02B 60/142* (2013.01); *Y02T 10/47* (2013.01)

(56) References Cited

U.S. PATENT DOCUMENTS

| | | | |
|---|---|---|---|
| 2010/0042284 A1* | 2/2010 | Sasaki | F02D 41/0072 701/31.4 |
| 2010/0199959 A1* | 8/2010 | Brown | F02D 41/0052 123/672 |
| 2013/0018566 A1* | 1/2013 | Khair | F02D 41/0065 701/102 |

* cited by examiner

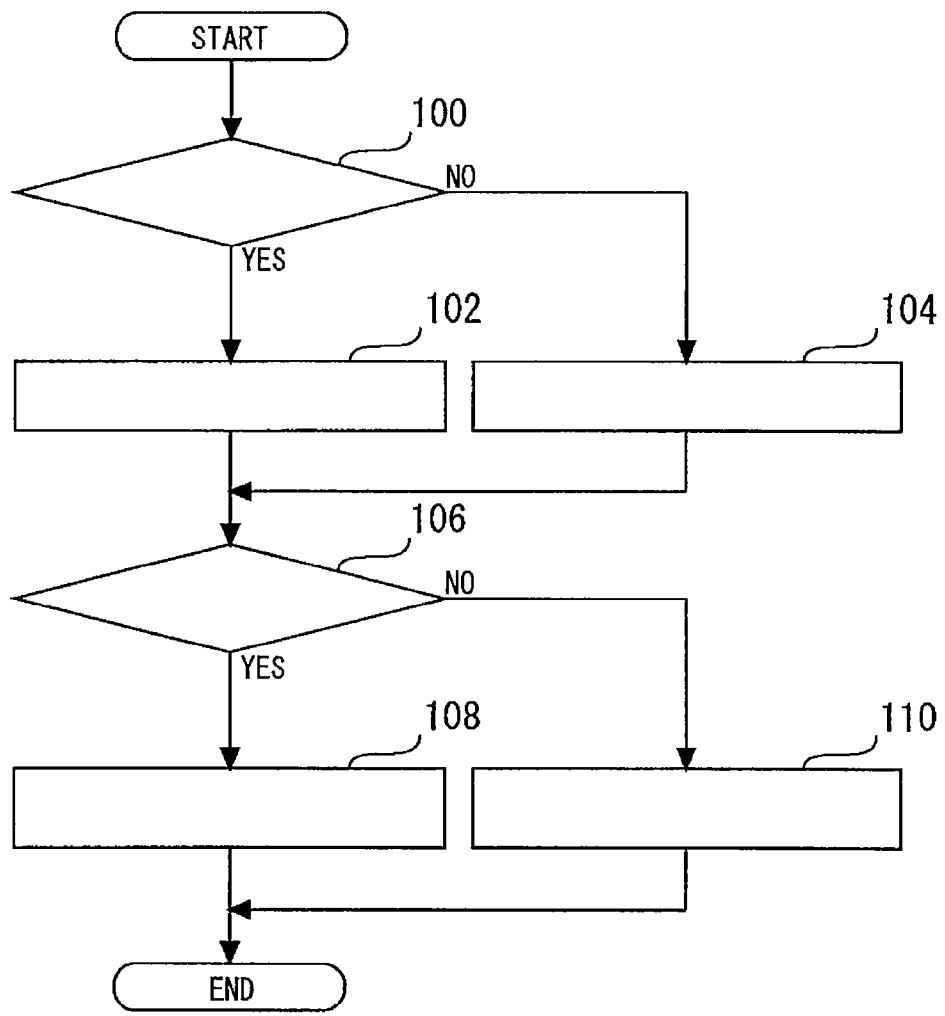

100: EGR cut of the LPL-EGR system is executed ?
102: designated cores to which the calculations relating to time evolution equation of the LPL-EGR rate, the flow rate calculation formula of the LPL-EGR, and the calculation formula of temperature reduction by the LPL-EGR cooler are stopped.
104: designated cores to which the calculations relating to time evolution equation of the LPL-EGR rate, the flow rate calculation formula of the LPL-EGR, and the calculation formula of temperature reduction by the LPL-EGR cooler are executed.
106: EGR cut of the HPL-EGR system is executed ?
108: designated cores to which the calculations relating to time evolution equation of the HPL-EGR rate, the flow rate calculation formula of the HPL-EGR, and the calculation formula of temperature reduction by the HPL-EGR cooler are stopped.
110: designated cores to which the calculations relating to time evolution equation of the HPL-EGR rate, the flow rate calculation formula of the HPL-EGR, and the calculation formula of temperature reduction by the HPL-EGR cooler are executed.

Fig. 2

CONTROL DEVICE OF INTERNAL COMBUSTION ENGINE

TECHNICAL FIELD

The present invention relates to a control device of an internal combustion engine, and particularly relates to a control device of an internal combustion engine that performs calculation by using a multicore processor having a plurality of cores.

BACKGROUND ART

Conventionally, as is disclosed in, for example, Japanese Patent Application Laid-Open No. 2008-269487, there has been disclosed an art that is for reducing the power consumption during engine stop for an engine controlling electronic control device including a microcomputer adopting at least one of a multicore configuration and a cache memory-mounted configuration. A CPU and a cache memory are both elements with large power consumption in a microcomputer. Thus, in the above described conventional art, during engine operation, the mode in which the CPU core and the cache memory are fully used to exhibit the maximum processing capability is selected, whereas during engine stop, the mode for decreasing the busy count of the CPU core and the use amount of the cache memory more than at the time of engine operation is selected.

CITATION LIST

Patent Literature

Patent Literature 1: Japanese Patent Laid-Open No. 2008-269487
Patent Literature 2: Japanese Patent Laid-Open No. 2009-541636

SUMMARY OF INVENTION

Technical Problem

Incidentally, in the model base control of an internal combustion engine using a control model of recent years, speedup of calculation can be achieved by performing parallel calculation processing with use of a multicore processor having a plurality of cores. However, the increase in the number of cores in use increases the calculation load, and the power consumption also tends to increase with this. Therefore, from the viewpoint of reduction of power consumption, efficient calculation resource distribution corresponding to a calculation load is preferably performed. In this regard, in the aforementioned conventional device, calculation resource distribution during engine operation is not taken into consideration at all, and the aforementioned conventional device still has room for improvement.

The present invention is made to solve the problem as described above, and has an object to provide a control device of an internal combustion engine capable of performing efficient distribution of cores for use corresponding to a calculation load of the internal combustion engine in the internal combustion engine that performs calculation processing by using a multicore processor having a plurality of cores.

Means for solving the Problems

In accomplishing the above object, according to a first aspect of the present invention, there is provided a control device of an internal combustion engine that has a multicore processor including a plurality of cores mounted thereon, and is capable of performing various calculations relating to an operation of the internal combustion engine in parallel by the plurality of cores, comprising:

calculation means that assigns a task of the calculations to at least one of the plurality of cores and performs calculations;

EGR means that controls an EGR operation that recirculates a gas flowing in an exhaust system of the internal combustion engine to an intake system; and control means that decreases a number of cores that are used in the calculation means to be smaller as compared with before stop, when the EGR operation is stopped.

According to a second aspect of the present invention, there is provided the control device as described in the first aspect, wherein when the EGR operation is started, the control means increases the number of cores that are used in the calculation means to be larger as compared with before the start.

According to a third aspect of the present invention, there is provided the control device as described in the first or second aspects, wherein the calculation means includes assigning means that assigns a task of a specific calculation relating to the EGR operation to one or a plurality of designated cores, and the control means stops the designated core or cores when the EGR operation is stopped.

According to a fourth aspect of the present invention, there is provided the control device as described in the third aspect, wherein the internal combustion engine comprises a turbo supercharger having a turbine installed in an exhaust passage, and a compressor installed in an intake passage, the EGR means includes means that controls HPL-EGR that recirculates a gas flowing in the exhaust passage at an upstream side from the turbine to the intake passage at a downstream side from the compressor, and means that controls LPL-EGR that recirculates a gas flowing in the exhaust passage at a downstream side from the turbine to the intake passage at the upstream side from the compressor, the assigning means assigns tasks of specific calculations relating to the HPL-EGR and the LPL-EGR respectively to different cores in the designated cores, and when the HPL-EGR and/or the LPL-EGR are/is stopped, the control means stops the designated core corresponding to the stopped EGR operation.

According to a fifth aspect of the present invention, there is provided the control device as described in any one of the first to fourth aspects, further comprising:

acquisition means that acquires a fuel injection amount a predetermined time ahead, of the internal combustion engine; and prediction means that predicts an operation situation of the EGR operation a predetermined time ahead, based on the fuel injection amount acquired by the acquisition means, wherein the control means increases and decreases the number of cores that are used in the calculation means, based on the operation situation of the EGR operation the predetermined time ahead, which is predicted by the prediction means.

Advantageous Effect of Invention

According to the first invention, in the execution time period of EGR cut in which the EGR operation is stopped, the number of cores for use is decreased to be smaller as compared with before the stop. During execution of the EGR cut, complicated calculations relating to EGR do not have to be performed, and therefore, the order of the model equation to be solved decreases to be smaller as compared with before the execution. Therefore, according to the present invention, the number of cores for use can be decreased in accordance with decrease of the calculation load, and therefore, efficient distribution of the cores for use corresponding to the calculation load of the internal combustion engine can be performed.

According to the second invention, after the system returns from EGR cut, the number of cores for use is increased to be larger as compared with before the return. Therefore, according to the present invention, the number of cores for use can be increased in response to increase of the order of the model to be solved, and therefore, efficient distribution of the cores for use corresponding to the operation load of the internal combustion engine can be performed.

According to the third invention, the task of the calculations relating to the EGR operation is assigned to one or a plurality of designated cores. At the time of EGR cut, use of the designated core or cores is stopped. Therefore, according to the present invention, the calculation that becomes unnecessary during execution of EGR cut is effectively stopped, and efficient distribution of the cores for use corresponding to the calculation load of the internal combustion engine can be performed.

According to the fourth invention, the task of the calculations relating to the HPL-EGR operation and the task of the calculations relating to the LPL-EGR operation are respectively assigned to different designated cores. At the time of EGR cut of any one or both of the HPL-EGR operation and LPL-EGR, use of the designated core corresponding to the EGR to be stopped is stopped. Therefore, according to the present invention, the calculations that become unnecessary during execution of the EGR cut are effectively stopped, and efficient distribution of the cores for use corresponding to the calculation load of the internal combustion engine can be performed.

According to the fifth invention, based on the fuel injection amount a predetermined time ahead, the operation situation of the EGR operation the predetermined time ahead is predicted. Therefore, according to the present invention, presence or absence of execution of EGR cut can be grasped in advance, and therefore, efficient distribution of the cores for use corresponding to the future calculation load of the internal combustion engine can be performed in advance.

BRIEF DESCRIPTION OF THE DRAWINGS

FIG. 2 is a flowchart of a routine executed in Embodiment 1 of the present invention.

MODE FOR CARRYING OUT THE INVENTION

Figure 1:
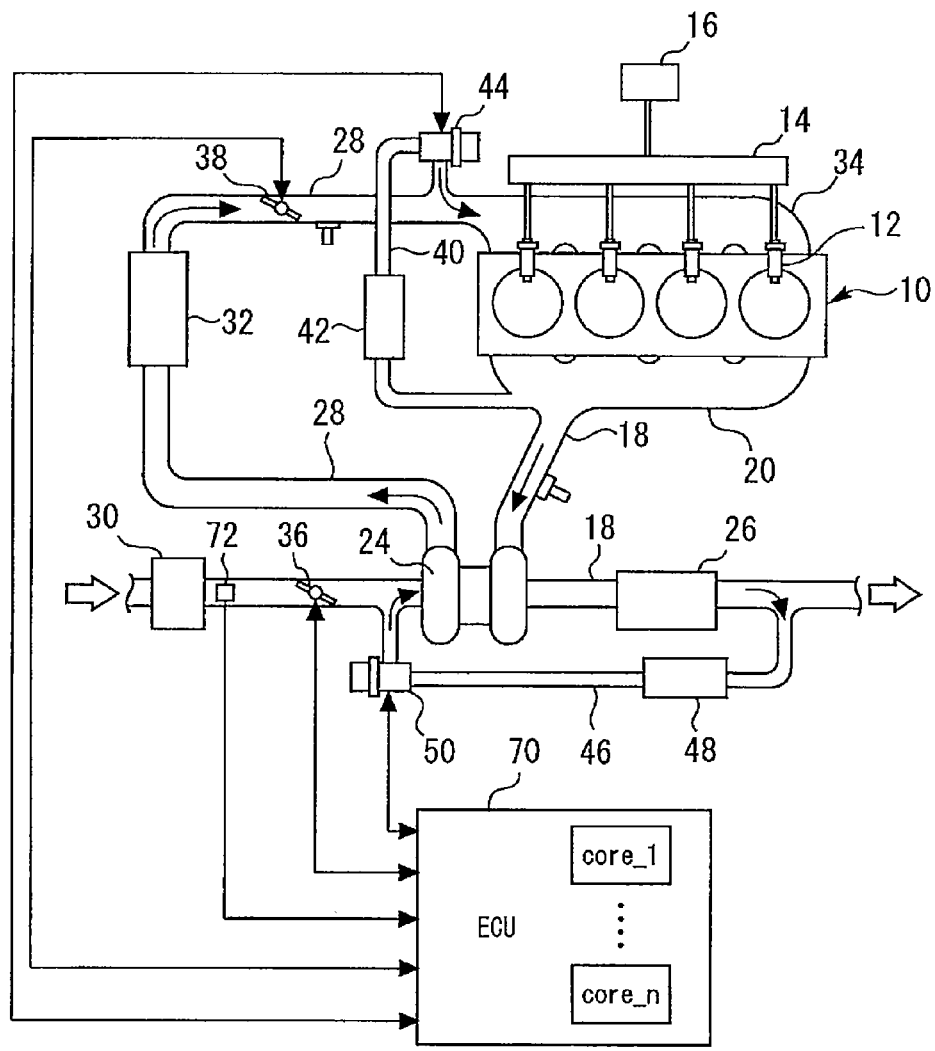
FIG. 1 is a diagram for explaining a schematic configuration of an internal combustion system as an embodiment of the present invention.

Hereinafter, an embodiment of the present invention will be described based on the drawings. Note that the common elements in the respective drawings will be assigned with the same reference signs to omit the redundant explanation. Further, the present invention is not limited by the following embodiment.

Embodiment 1
[Configuration of Embodiment 1]

FIG. 1 is a diagram for explaining a schematic configuration of an internal combustion system as an embodiment of the present invention. As shown in FIG. 1, the system of the present embodiment includes a four-cycle internal combustion engine (diesel engine) 10 having a plurality of cylinders (four cylinders in FIG. 1). The internal combustion engine 10 is mounted on a vehicle, and is used as a power source thereof.

In the respective cylinders of the internal combustion engine 10, injectors 12 for directly injecting fuel into the cylinders are installed. The injectors 12 of the respective cylinders are connected to a common rail 14 that is common thereto. The fuel in a fuel tank not illustrated is pressurized to a predetermined fuel pressure by a supply pump 16, is stored in the common rail 14, and is supplied to the respective injectors 12 from the common rail 14.

An exhaust passage 18 of the internal combustion engine 10 is branched by the exhaust manifold 20 to be connected to exhaust ports (not illustrated) of the respective cylinders. The exhaust passage 18 is connected to an exhaust turbine of a turbo supercharger 24. At a downstream side of the turbo supercharger 24 in the exhaust passage 18, an after treatment device 26 for purifying an exhaust gas is provided. As the after treatment device 26, for example, an oxidation catalyst, an NOx catalyst, a DPF (Diesel Particulate Filter), a DPNR (Diesel Particulate-NOx-Reduction system) or the like can be used.

An air cleaner 30 is provided in a vicinity of an inlet of an intake passage 28 of the internal combustion engine 10. Air that is taken in through the air cleaner 30 is compressed with an intake compressor of the turbo supercharger 24, and thereafter, is cooled in an intercooler 32. The intake air that passes through the intercooler 32 is distributed to intake ports (not illustrated) of the respective cylinders by an intake manifold 34.

Between the air cleaner 30 and the turbo supercharger 24 in the intake passage 28, a first intake air throttle valve 36 is provided. Further, between the intercooler 32 and the intake manifold 34 in the intake passage 28, a second intake air throttle valve 38 is installed. Furthermore, in a downstream vicinity of the air cleaner 30 in the intake passage 28, an air flow meter 52 for detecting an intake air amount is installed.

To a vicinity of the intake manifold 34 in the intake passage 28, one end of an HPL (High Pressure Loop)-EGR passage 40 is connected. The other end of the HPL-EGR passage 40 is connected to a vicinity of the exhaust manifold 20 in the exhaust passage 18. In the present system, through the HPL-EGR passage 40, external EGR (hereinafter, called "HPL-EGR") that recirculates a part of the exhaust gas (burned gas) to the intake passage 28 can be performed.

Halfway through the HPL-EGR passage 40, an HPL-EGR cooler 42 for cooling an HPL-EGR gas is provided. An HPL-EGR valve 44 is provided downstream of the HPL-EGR cooler 42 in the HPL-EGR passage 40. By changing an opening of the HPL-EGR valve 44, an amount of exhaust gas that passes through the HPL-EGR passage 40, that is, an HPL-EGR amount can be regulated.

Further, to a vicinity of an upstream side of the turbo supercharger 24 in the intake passage 28, one end of an LPL (Low Pressure Loop)-EGR passage 46 is connected. The other end of the LPL-EGR passage 46 is connected to a vicinity of a downstream side of the after treatment device 26 in the exhaust passage 18. In the present system, through the LPL-EGR passage 46, external EGR (hereinafter, called "LPL-EGR") that recirculates a part of the exhaust gas (burned pas) to the intake passage 28 upstream of the turbo supercharger 24 can be performed.

Halfway through the LPL-EGR passage 46, an LPL-EGR cooler 48 for cooling an LPL-EGR gas is provided. An LPL-EGR valve 50 is provided downstream of the LPL-EGR cooler 48 in the LPL-EGR passage 46. By changing an opening of the LPL-EGR valve 50, an amount of the exhaust gas that passes through the LPL-EGR passage 46, that is, an LPL-EGR amount can be regulated.

The system of the present embodiment includes an ECU (Electronic Control Unit) 70 as shown in FIG. 1. The ECU 70 is configured as a multicore ECU having a processor including n cores (core_1 to core_n) mounted thereon, and can variably set use/stop respectively for each of the cores. To an input section of the ECU 70, various sensors for controlling the internal combustion engine 10, such as an accelerator position sensor for detecting a depressing amount (an accelerator opening) of an accelerator pedal, and a crank angle sensor for detecting a crank angle of the internal combustion engine 10 are connected, in addition to the aforementioned air flow meter 52. Further, to an output section of the ECU 70, various actuators for controlling the internal combustion engine 10 are connected, in addition to the injector 12, the intake air throttle valves 36 and 38, and the EGR valves 44 and 50 that are described above. The ECU 70 executes a predetermined control algorism for driving various actuators based on various kinds of information that are inputted therein.

[Operation of Embodiment 1]
(Control of HPL-EGR)

The HPL-EGR is performed by recirculating a part of an exhaust gas (burned gas) to the intake passage 28 through the HPL-EGR passage 40. More specifically, an opening of the HPL-EGR valve 44 is regulated in response to an operation state of the internal combustion engine 10, and the exhaust gas is introduced into the HPL-EGR passage 40. The introduced exhaust gas is cooled in the HPL-EGR cooler 42 and thereafter, is recirculated to the intake passage 28.

Further, the HPL-EGR amount can be regulated according to not only the opening of the HPL-EGR valve 44, but also by an opening of the second intake air throttle valve 38. When the opening of the second intake air throttle valve 38 is made small to throttle intake air, an intake pressure becomes small, and therefore, a differential pressure from a back pressure (an exhaust pressure) becomes large. Namely, the differential pressure between pressures in front and in the rear of the HPL-EGR passage 40 becomes large. Thereby, the amount of the HPL-EGR can be effectively increased.

(Control of LPL-EGR)

The LPL-EGR is performed by recirculating a part of the exhaust gas (burned gas) to the upstream side of the turbo supercharger 24 in the intake passage 28 through the LPL-EGR passage 46. More specifically, an opening of the LPL-EGR valve 50 is regulated in response to the operation state of the internal combustion engine 10, and the exhaust gas is introduced into the LPL-EGR passage 46. The introduced exhaust gas is cooled in the LPL-EGR cooler 48, and thereafter, is recirculated to the intake passage 28.

Further, the LPL-EGR amount can be regulated by not only the opening of the LPL-EGR valve 50, but also by an opening of the first intake air throttle valve 36. More specifically, when the opening of the first intake air throttle valve 36 is made small to throttle intake air, coupled with drive of the turbo supercharger 24, the intake pressure in a vicinity of a connection portion with the LPL-EGR passage 46 in the intake passage 28 becomes low. Thereby, a differential pressure between the pressures in front and in the rear of the LPL-EGR passage 46 can be made large, and therefore, the amount of the LPL-EGR can be effectively increased.

(EGR Control in Response to Operation Condition)

As described above, the system of the present embodiment includes two external EGR systems that are the HPL-EGR and the LPL-EGR. These EGR systems respectively have different operation regions in which EGR can be efficiently carried out. Thus, in the system of the present embodiment, these EGRs are properly used based on the operation conditions of the internal combustion engine 10. More specifically, for example, in a region with a relatively low load, it is preferable to cut off the LPL-EGR and carry out the HPL-EGR. This is because in the region with a low load, the intake pressure and the back pressure are both low, and therefore, such a differential pressure that can carry out the LPL-EGR efficiently does not occur. Further, when the operation region of the internal combustion engine 10 becomes a region with about a middle load that is larger than the load in the HPL region, it is preferable to cut off the HPL-EGR and carry out the LPL-EGR. This is because the intake pressure and the back pressure rise to a certain degree by drive of the turbo supercharger 24, and the differential pressure between the pressures in front and in the rear of the LPL-EGR passage 46 becomes large enough to carry out the LPL-EGR. However, even in the middle load region, if the engine speed is relatively low in the region, the HPL-EGR can be carried out simultaneously. Furthermore, in the region where the engine speed is relatively high in the middle load region, it is preferable to cut off the HPL-EGR and carry out the LPL-EGR. This is because in a predetermined high speed region in the middle load region, the differential pressure between the pressures in front and in the rear of the HPL-EGR passage 40 becomes small due to rise of the supercharging pressure, and therefore, the differential pressure which is enough to carry out the HPL-EGR efficiently is not generated. As above, by properly using the two external EGR systems in accordance with the operation regions of the internal combustion engine 10, EGR can be efficiently performed in a wide operation region.

[Characteristic Operation of Embodiment 1]

Next, a characteristic operation of embodiment 1 will be described. The internal combustion engine 10 according to the present embodiment includes various actuators for controlling the internal combustion engine 10 such as the intake air throttle valves 36 and 38 and the EGR valves 44 and 50, for example, as the actuators for controlling the operation thereof. The control device of the present embodiment controls the internal combustion engine by so-called model base control. The control device estimates a control state by using a number of model predictions, and determines the control variables of the various actuators described above.

In the system of the present embodiment, parallel calculation processing using the multicore ECU is executed. More specifically, in an engine model, core distribution is performed for each of respective sub models. Further, for a sub model with a large calculation load, more minute core distribution is performed by an automatic compiler. Note that as the automatic compiler, a known parallelizing compiler such as an OSCAR (Optimally Scheduled Advanced Multiprocessor), for example, can be used. Calculation tasks that are distributed to the respective cores by core distribution are calculated in parallel by the respective cores.

Here, in the model base control described above, calculations relating to the EGR is not always needed during operation of the internal combustion engine 10. Namely, as described above, in the system of the present embodiment, the HPL-EGR and the LPL-EGR are properly used in accordance with the operation state of the internal combustion engine 10. Therefore, in a time period in which the EGR of any one of the external EGR systems is cut off, there is no problem even if specific calculations about the EGR that is cut, such as a time evolution equation of the EGR rate, an EGR flow rate calculation formula, and a calculation formula of temperature reduction by the EGR cooler, are stopped, and from the viewpoint of reduction of the calculation load, it is rather preferable to stop these calculations.

Thus, in the system of the present embodiment, in the time period in which EGR cut is performed for any one of the external EGR systems, the number of cores for use in calculation is decreased. More specifically, specific calculations relating to the respective EGR systems are respectively assigned to one or a plurality of designated cores that is or are designated from a plurality of cores, and in the time period in which EGR cut is performed for any one of the EGR systems, the designated cores that are assigned with the calculations relating to the EGR system under EGR cut can be stopped. Thereby, the cores in which unnecessary calculations are performed can be effectively stopped, and therefore, by effectively distributing the remaining calculation resources, reduction in the calculation load can be achieved as the entire system. Thereby, task omission is avoided, and control of the internal combustion engine can be realized with high precision.

Further, in the system of the present embodiment, at a time point when the system returns from EGR cut of the internal combustion engine 10, calculations in the above described stopped cores are started again. Thereby, increase in the calculation load accompanying start of the calculations relating to the EGR can be effectively dealt with by increasing the number of cores for use, and therefore, efficient distribution of the cores for use corresponding to the calculation load of the internal combustion engine 10 can be performed.

[Specific Processing in Embodiment 1]

Next, with reference to FIG. 2, a specific content of processing that is executed in the present embodiment will be described. FIG. 2 is a flowchart of a routine of the ECU 70 increasing and decreasing the number of cores for use that are used in calculations. Note that the routine shown in FIG. 2 is repeatedly executed during operation of the internal combustion engine 10. Further, as a precondition for executing the routine shown in FIG. 2, the specific calculations relating to the LPL-EGR and the HPL-EGR are already distributed to the respective designated cores in this case.

In the routine shown in FIG. 2, it is firstly determined whether or not EGR cut of the LPL-EGR system is executed in the internal combustion engine 10 (step 100). When it is determined that LPL-EGR cut is executed in the internal combustion engine 10 as a result, it is determined that the specific calculations relating to the LPL-EGR system is not necessary, the flow proceeds to the next step, and the designated cores to which the specific calculations relating to the LPL-EGR system are stopped (step 102). Here, more specifically, one or a plurality of designated cores that is or are assigned with the time evolution equation of the LPL-EGR rate, the flow rate calculation formula of the LPL-EGR, and the calculation formula of temperature reduction by the EGR cooler 48 of the LPL system as the specific calculations relating to the LPL-EGR system, is or are stopped.

Meanwhile, in the above described step 100, when it is determined that LPL-EGR cut is not executed, the specific calculations relating to the LPL-EGR system are executed by the designated cores (step 104).

Next, it is determined whether or not EGR cut of the HPL-EGR system is executed in the internal combustion engine 10 (step 106). When it is determined that HPL-EGR cut is executed in the internal combustion engine 10 as a result, it is determined that specific calculations relating to the HPL-EGR system are not necessary, the flow proceeds to the next step, and the designated cores that are assigned with specific calculations relating to the HPL-EGR system are stopped (step 108). Here, more specifically, one or a plurality of designated cores that are assigned with the time evolution equation of the HPL-EGR rate, the flow rate calculation formula of the HPL-EGR, and the calculation formula of temperature reduction by the EGR cooler 42 of the HPL system as the specific calculations relating to the HPL-EGR system is or are stopped.

Meanwhile, when it is determined that HPL-EGR cut is not executed in the above described step 106, the specific calculations relating to the HPL-EGR system are executed by the designated cores (step 108).

As described above, according to the present embodiment, in the time period in which the EGR cut of the internal combustion engine 10 is executed, the cores that is assigned with the specific calculations relating to the external EGR system for which the EGR cut is performed are stopped. Thereby, the cores in which unnecessary calculations are performed can be effectively stopped in accordance of implementation of the EGR cut, and therefore, by effectively distributing the remaining calculation resources, reduction in the calculation load can be achieved as the entire system.

Incidentally, in embodiment 1 described above, the case of applying the present invention to control of the diesel engine (the compression ignition internal combustion engine) is described, but the present invention is not limited to a diesel engine, and can be applied to control of a spark ignition internal combustion engine using gasoline or alcohol as fuel, and control of various other internal combustion engines.

Further, in embodiment 1 described above, the system including the two systems of LPL-EGR and HPL-EGR as the external EGR systems is described as an example, but the present invention may be applied to a system that includes only any one of these external EGR systems.

Further, in embodiment 1 described above, as the specific calculations relating to the respective EGR systems, the calculations of the time evolution equation of the EGR rate, the flow rate calculation formula of EGR, and the calculation formula of the temperature reduction by the EGR cooler are described as examples, but the calculations that are assigned to the designated cores are not limited thereto. Namely, any calculations may be assigned to the designated cores similarly to the above description if only the calculations become unnecessary at the time of EGR cut.

Further, in embodiment 1 described above, in the execution time period of the EGR cut, the designated cores that are assigned with the specific calculations relating to the EGR are stopped, but the stoppable cores are not limited to the designated cores. Namely, in the time period in which the EGR cut is executed, the order of the model equation to be solved in the engine model decreases, and therefore, the calculation loads decrease in no small quantities. Therefore, in the time period in which the EGR cut is executed, some cores are stopped, and the tasks of the stopped cores are distributed to the remaining cores for use, whereby efficient distribution of the cores for use corresponding to the calculation load of the internal combustion engine can be performed while the number of cores for use is decreased.

Further, in embodiment 1 described above, presence or absence of execution of EGR cut at the present point time is determined, but presence or absence of execution of future EGR cut may be determined based on a fuel injection amount a predetermined time ahead. More specifically, by performing an injection amount delay of 32 ms, for example, presence or absence of execution of EGR cut 32 ms ahead can be determined. Thereby, presence or absence of execution of EGR cut can be grasped in advance, and therefore, efficient distribution of the cores for use corresponding to the future calculation load of the internal combustion engine can be performed in advance.

DESCRIPTION OF REFERENCE CHARACTERS

10: internal combustion engine (engine)
18: exhaust passage
24: turbo supercharger
28: intake passage
36: first intake air throttle valve
38: second intake air throttle valve
40: HPL-EGR passage
42: HPL-EGR cooler
44: HPL-EGR valve
46: LPL-EGR passage
48: LPL-EGR cooler
50: LPL-EGR valve
70: ECU (electronic control unit)

The invention claimed is:

1. A control device of an internal combustion engine that has a multicore processor including a plurality of cores mounted thereon, and is capable of performing various calculations relating to an operation of the internal combustion engine in parallel by the plurality of cores, comprising:
    calculation means that assigns a task of the calculations to at least one of the plurality of cores and performs calculations;
    EGR means that controls an EGR operation that recirculates a gas flowing in an exhaust system of the internal combustion engine to an intake system; and
    control means that decreases a number of cores that are used in the calculation means to be smaller as compared with before stop, when the EGR operation is stopped,
    wherein the calculation means including:
        model calculation means that performs a specific calculation relating to the EGR operation by using an engine model of the internal combustion engine; and
        assigning means that assigns a task of a calculation relating to the model calculation means to one or a plurality of designated cores,
    the control means stops the designated core or cores when the EGR operation is stopped,
    wherein the internal combustion engine comprises a turbo supercharger having a turbine installed in an exhaust passage, and a compressor installed in an intake passage,
    the EGR means includes
    means that controls HPL-EGR that recirculates a gas flowing in the exhaust passage at an upstream side from the turbine to the intake passage at a downstream side from the compressor, and
    means that controls LPL-EGR that recirculates a gas flowing in the exhaust passage at a downstream side from the turbine to the intake passage at the upstream side from the compressor,
    the assigning means assigns tasks of specific calculations relating to the HPL-EGR and the LPL-EGR respectively to different cores in the designated cores, and
    when at least one of the HPL-EGR and the LPL-EGR is stopped, the control means stops the designated core corresponding to the stopped EGR operation.

2. The control device of an internal combustion engine according to claim 1,
    wherein when the EGR operation is started, the control means increases the number of cores that are used in the calculation means to he larger us compared with before the start.

3. The con device of an internal combustion engine according to claim 1, further comprising:
    acquisition means that acquires a fuel injection amount a predetermined time ahead, of the internal combustion engine; and
    prediction means that predicts an operation situation of the EGR operation a predetermined time ahead, based on the fuel injection amount acquired by the acquisition means,
    wherein the control means increases and decreases the number of cores that are used in the calculation means, based on the operation situation of the EGR operation the predetermined time ahead, which is predicted by the prediction means.

4. A control device of an internal combustion engine that has a multicore processor including a plurality of cores mounted thereon, and is capable of performing various calculations relating to an operation of the internal combustion engine in parallel by the plurality of cores, comprising:
    electronic control that assigns a task of the calculations to at least one of the plurality of cores and performs calculations; and
    EGR system that controls an EGR operation that recirculates a gas flowing in an exhaust system of the internal combustion engine to an intake system; and
    wherein the electronic control unit is programmed to assign a task of a specific calculation relating to the EGR operation by using an engine model of the internal combustion engine to at least one of the plurality of cores and performs calculations, and
    stop the designated core or cores when the EGR operation is stopped,
    wherein the internal combustion engine comprises a turbo supercharger having a turbine installed in an exhaust passage, and a compressor installed in an intake passage,
    the EGR system includes
    system that controls HPL-EGR that recirculates a gas flowing in the exhaust passage at an upstream side from the turbine to the intake passage at a downstream side from the compressor, and
    system that controls LPL-EGR that recirculates a gas flowing in the exhaust passage at a downstream side from the turbine to the intake passage at the upstream side from the compressor, wherein the electronic control unit is further programmed to assign tasks of specific calculations relating to the HPL-EGR and the LPL-EGR respectively to different cores in the designated cores, and when at least one of the HPL-EGR and the LPL-EGR is stopped, stop the designated core corresponding to the stopped EGR operation.

\* \* \* \* \*